United States Patent
Hughes et al.

(10) Patent No.: US 10,408,455 B2
(45) Date of Patent: Sep. 10, 2019

(54) FUEL NOZZLE ASSEMBLY WITH FUEL INLET SLOTS

(71) Applicant: General Electric Company, Schenectady, NY (US)

(72) Inventors: Michael John Hughes, Pittsburgh, PA (US); James Scott Flanagan, Simpsonville, SC (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 15/181,539

(22) Filed: Jun. 14, 2016

(65) Prior Publication Data
US 2017/0356655 A1    Dec. 14, 2017

(51) Int. Cl.
*F23R 3/28* (2006.01)
*F02C 7/22* (2006.01)
*F02C 3/04* (2006.01)

(52) U.S. Cl.
CPC ............... *F23R 3/28* (2013.01); *F02C 3/04* (2013.01); *F02C 7/222* (2013.01); *F23R 3/286* (2013.01)

(58) Field of Classification Search
CPC .. F23R 3/28; F23R 3/283; F23R 3/286; F23D 14/62; F23D 14/64; F23D 11/40
See application file for complete search history.

(56) References Cited

U.S. PATENT DOCUMENTS

| | | | | |
|---|---|---|---|---|
| 4,100,733 A | * | 7/1978 | Striebel | F23R 3/286 239/419.3 |
| 4,408,461 A | * | 10/1983 | Bruhwiler | F23R 3/32 60/737 |
| 8,147,121 B2 | * | 4/2012 | Lacy | F23R 3/34 366/134 |
| 8,800,289 B2 | | 8/2014 | Johnson et al. | |
| 9,291,103 B2 | * | 3/2016 | Belsom | F23R 3/286 |
| 2009/0158743 A1 | * | 6/2009 | Francis | F02C 7/222 60/748 |
| 2017/0343217 A1 | * | 11/2017 | Chen | F02C 6/003 |

* cited by examiner

*Primary Examiner* — Gerald L Sung
*Assistant Examiner* — Christopher M Adams
(74) *Attorney, Agent, or Firm* — Dority & Manning, P.A.

(57) ABSTRACT

The present disclosure is directed to a bundled tube type fuel nozzle assembly. The fuel nozzle assembly includes a fuel plenum body including a forward plate, an aft plate, an outer band that extends between the forward plate and the aft plate and a fuel plenum defined within the fuel plenum body. A plurality of tubes extends through the fuel plenum. Each tube of the plurality of tubes includes an inlet defined along an outer surface of the forward plate and an outlet defined downstream from the inlet. The forward plate defines a plurality of fuel inlet slots that is in fluid communication with the fuel plenum. Each fuel inlet slot extends radially outwardly with respect to an axial centerline of the fuel plenum body along the outer surface of the forward plate.

17 Claims, 5 Drawing Sheets

FUEL NOZZLE ASSEMBLY WITH FUEL INLET SLOTS

STATEMENT REGARDING FEDERALLY SPONSORED RESEARCH OR DEVELOPMENT

This invention was made with Government support under Contract No. DE-FC26-05NT42643 awarded by the US Department of Energy (DOE) under the American Recovery and Reinvestment Act (ARRA). The Government has certain rights in this invention.

FIELD OF THE TECHNOLOGY

The present invention generally involves a bundled tube type fuel nozzle assembly for a gas turbine combustor. More specifically, the invention relates to a bundled tube type fuel nozzle assembly having a non-circular fuel supply inlet.

BACKGROUND

Particular combustion systems for gas turbine engines utilize combustors having bundled tube type fuel nozzles for premixing a gaseous fuel with a compressed air upstream from a combustion zone. A bundled tube type fuel nozzle assembly generally includes a tube bundled including multiple tubes that extend through a fuel plenum body which is at least partially defined by a forward plate, an aft plate and an outer band that extends between the forward plate and the aft plate. Each tube includes an inlet defined at or upstream from the forward plate and an outlet defined at or downstream from the aft plate. During operation, compressed air flows into the inlet of each tube. Fuel from the fuel plenum is injected into one or more of the tubes where it premixes with the compressed air. The premixed fuel and compressed air is then routed into the combustion zone.

Fuel is provided to the fuel plenum via an annular fluid conduit which is fluidly coupled to a round opening defined in the forward plate. The tubes of the tube bundle are annularly arranged around the round opening to accommodate the fluid conduit. Because the tubes are straight or extend linearly from the inlet to the outlet, a corresponding round blank or bluff area is formed at the aft plate which may be challenging to cool during operation. In addition, the fluid conduit reduces the total number of tubes of the tube bundle which may result in non-uniform fuel distribution from the fuel nozzle assembly to the combustion zone.

BRIEF DESCRIPTION OF THE TECHNOLOGY

Aspects and advantages are set forth below in the following description, or may be obvious from the description, or may be learned through practice.

One embodiment of the present disclosure is a fuel nozzle assembly. The fuel nozzle assembly includes a fuel plenum body including a forward plate, an aft plate, an outer band that extends between the forward plate and the aft plate and a fuel plenum defined within the fuel plenum body. A plurality of tubes extends through the fuel plenum. Each tube of the plurality of tubes includes an inlet defined along an outer surface of the forward plate and an outlet defined downstream from the inlet. The forward plate defines a plurality of fuel inlet slots that is in fluid communication with the fuel plenum. Each fuel inlet slot extends radially outwardly with respect to an axial centerline of the fuel plenum body along the outer surface of the forward plate.

Another embodiment of the present disclosure is a combustor. The combustor includes an end cover coupled to an outer casing and a fuel nozzle assembly disposed within the outer casing and coupled to the end cover via one or more fluid conduits. The fuel nozzle assembly includes a fuel plenum body having a forward plate, an aft plate, an outer band that extends between the forward plate and the aft plate, a fuel plenum defined within the fuel plenum body and a plurality of tubes. Each tube extends through the fuel plenum and includes an inlet defined along an outer surface of the forward plate and an outlet defined downstream from the inlet. The forward plate defines a plurality of fuel inlet slots in fluid communication with the fuel plenum. Each fuel inlet slot extends radially outwardly with respect to an axial centerline of the fuel plenum body along the outer surface of the forward plate.

Another embodiment of the present disclosure is directed to a gas turbine. The gas turbine includes a compressor and a combustor disposed downstream from the compressor. The combustor includes an outer casing and an end cover that is coupled to the outer casing. The gas turbine further includes a turbine disposed downstream from the combustor. The combustor further includes a fuel nozzle assembly that is disposed within the outer casing and which is coupled to the end cover via one or more fluid conduits. The fuel nozzle assembly comprises a fuel plenum body including a forward plate, an aft plate, an outer band that extends between the forward plate and the aft plate and a fuel plenum defined within the fuel plenum body. A plurality of tubes extends through the fuel plenum. Each tube of the plurality of tubes includes a respective inlet that is defined along an outer surface of the forward plate and a respective outlet that is defined downstream from the inlet. The forward plate defines a plurality of fuel inlet slots which is in fluid communication with the fuel plenum. Each fuel inlet slot extends radially outwardly with respect to an axial centerline of the fuel plenum body along the outer surface of the forward plate.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
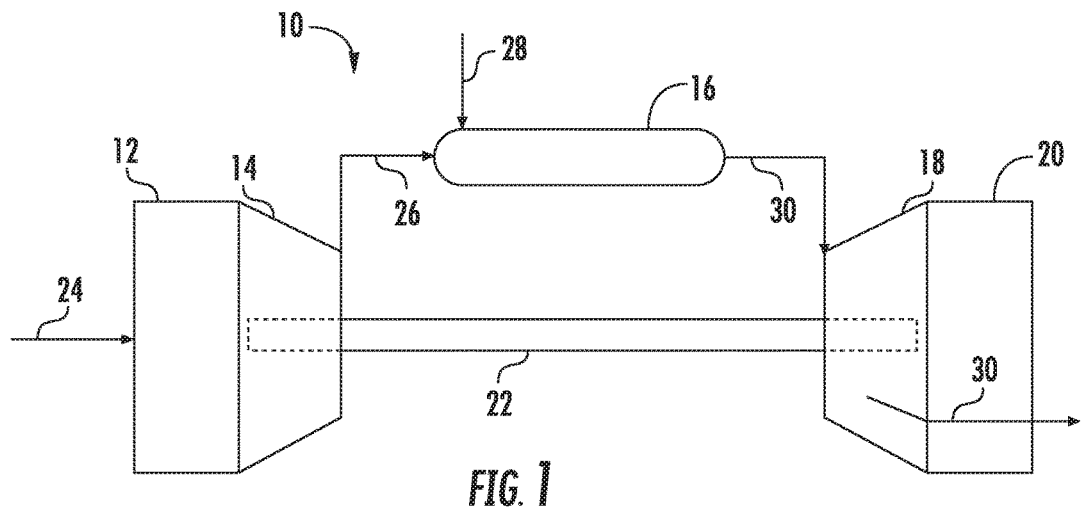
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a bundled tube type fuel nozzle assembly for a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
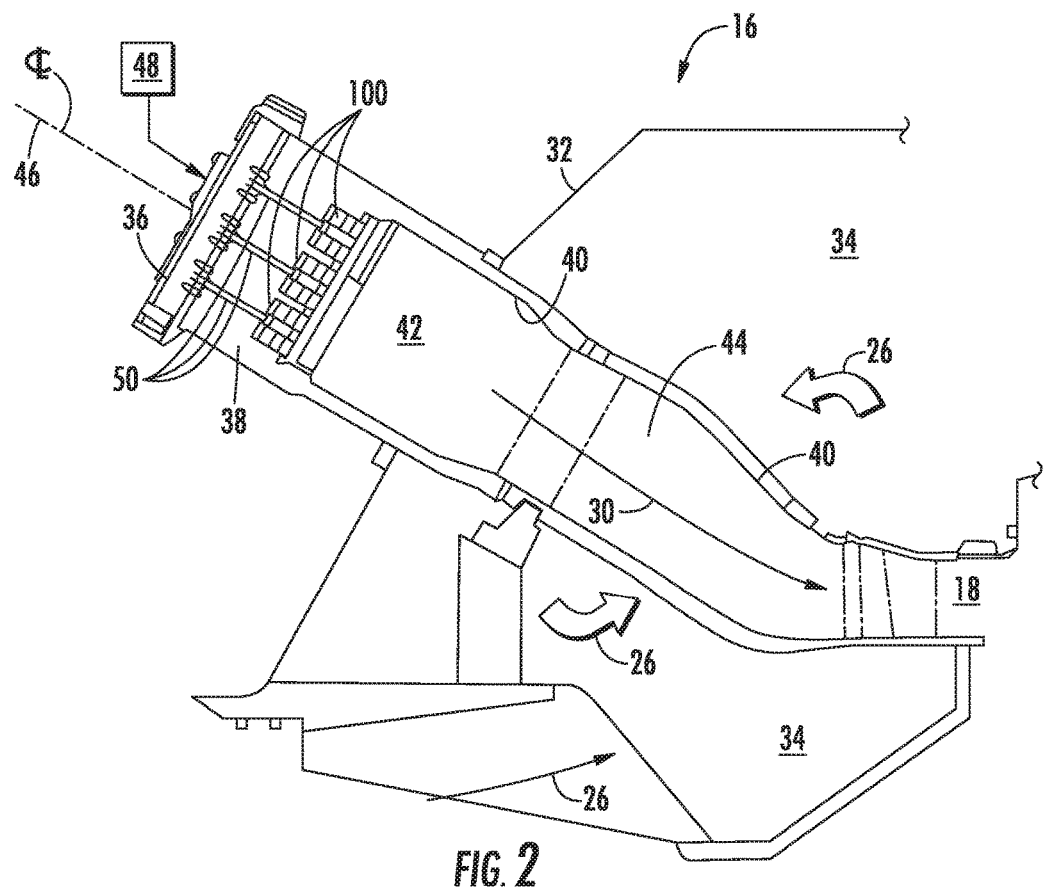
FIG. 2 is a simplified cross-section side view of an exemplary combustor as may incorporate various embodiments of the present disclosure.

As shown in FIG. 2, the combustor 16 may be at least partially surrounded an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. An end cover 36 may be coupled to the outer casing 32. In particular embodiments, the outer casing 32 and the end cover 36 may at least partially define a head end volume or portion 38 of the combustor 16.

In particular embodiments, the head end portion 38 is in fluid communication with the high pressure plenum 34 and/or the compressor 14. One or more liners or ducts 40 may at least partially define a combustion chamber or zone 42 for combusting the fuel-air mixture and/or may at least partially define a hot gas path 44 through the combustor, for directing the combustion gases 30 towards an inlet to the turbine 18.

In various embodiments, the combustor 16 includes at least one bundled tube type fuel nozzle assembly 100. As shown in FIG. 2, the fuel nozzle assembly 100 is disposed within the outer casing 32 downstream from and/or axially spaced from the end cover 36 with respect to axial centerline 46 of the combustor 16 and upstream from the combustion chamber 42. In particular embodiments, the fuel nozzle assembly 100 is in fluid communication with a gas fuel supply 48 via one or more fluid conduits 50. In particular embodiments, the fluid conduit(s) 50 may be fluidly coupled and/or connected at one end to the end cover 36 and at a second end to a corresponding fuel nozzle assembly 100. Various embodiments of the combustor 16 may include different arrangements of the fuel nozzle assembly 100 and is not limited to any particular arrangement unless otherwise specified in the claims. For example, in particular configurations, the fuel nozzle assembly 100 includes multiple wedge shaped bundled tube fuel nozzle segments annularly arranged about centerline 46. In particular embodiments, the fuel nozzle assembly 100 may form an annulus or fuel nozzle passage about a center fuel nozzle.

Figure 3:
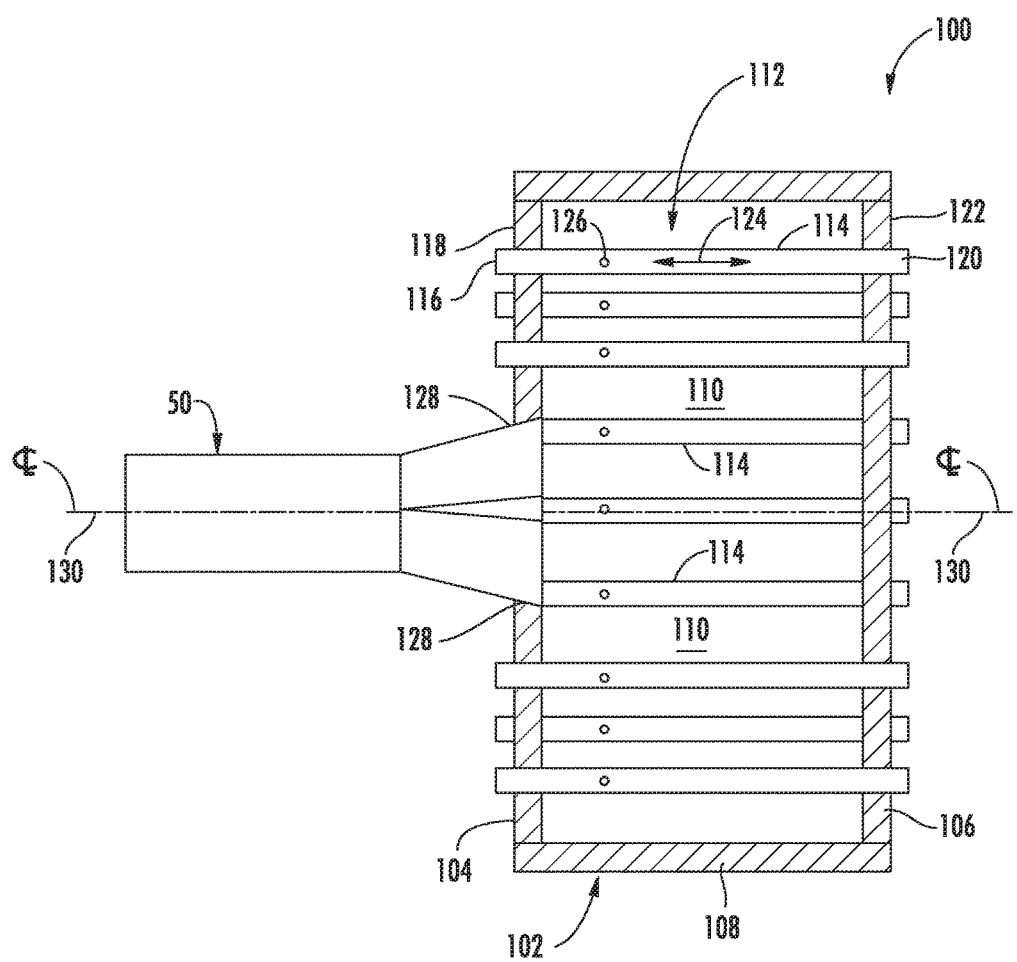
FIG. 3 is a cross sectioned side view of a portion of an exemplary fuel nozzle assembly as shown in FIG. 2, according to at least one embodiment of the present disclosure.

FIG. 3 provides a cross sectioned side view of a portion of an exemplary fuel nozzle assembly 100 as shown in FIG. 2, according to at least one embodiment of the present disclosure. In at least one embodiment, as shown in FIG. 3, the fuel nozzle assembly 100 includes a fuel plenum body 102 having a forward or upstream plate 104, an aft plate 106 axially spaced from the forward plate 104 and an outer band or shroud 108 that extends axially between the forward plate 104 and the aft plate 106. A fuel plenum 110 is defined within the fuel plenum body 102. In particular embodiments, the forward plate 104, the aft plate 106 and the outer band 108 may at least partially define the fuel plenum 110. In particular embodiments, fluid conduit 50 is coupled to the forward plate 104 to provide fuel to the fuel plenum 110.

As shown in FIG. 3, the fuel nozzle assembly 100 includes a tube bundle 112 comprising a plurality of tubes 114. Each tube 114 extends through the forward plate 104, the fuel plenum 110 and the aft plate 106. The tubes 114 may be fixedly connected to and/or form a seal against the aft plate 106. For example, the tubes 114 may be welded, brazed or otherwise connected to the aft plate 106. Each tube 114 includes an inlet 116 defined upstream from or along an outer surface 118 of the forward plate 104 and an outlet 120 that is defined at or downstream from an outer or hot side surface 122 of the aft plate 106. One or more of the tubes 114 defines a respective premix flow passage 124 through the fuel nozzle assembly 100. In particular embodiments, one or more tubes 114 of the plurality of tubes 114 is in fluid communication with the fuel plenum 110 via one or more fuel ports 126 defined by the respective tube(s) 114. In particular embodiments, each tube 114 is in fluid communication with the fuel plenum 110 via one or more fuel ports 126 defined within the respective tube(s) 114. In particular embodiments, each tube 114 defines a respective premix flow passage 124 through the fuel nozzle assembly 100.

Figure 4:
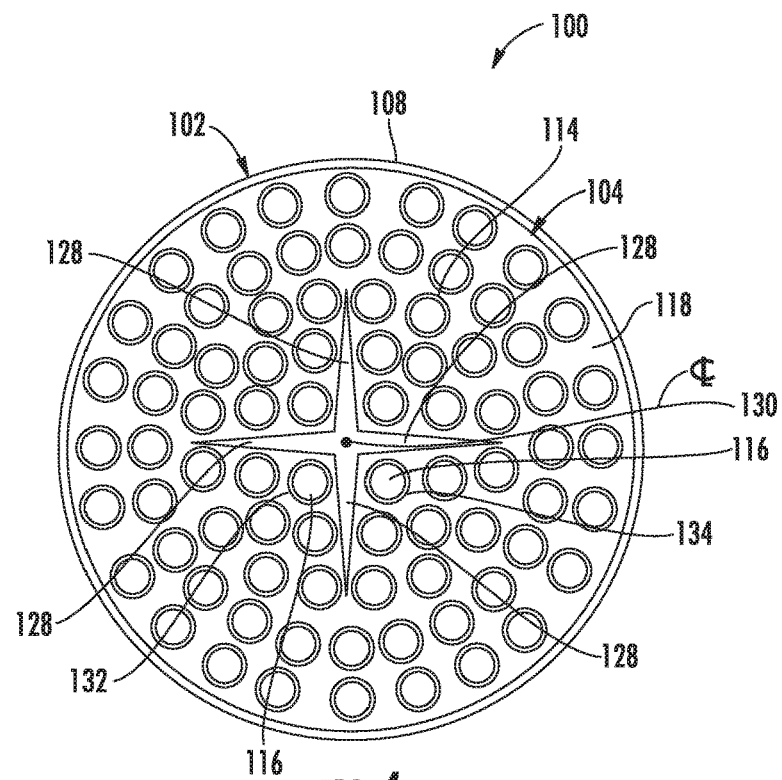
FIG. 4 is a downstream view of a forward plate of the fuel nozzle assembly as shown in FIG. 3, according to at least one embodiment of the present disclosure.

In various embodiments, the forward plate 104 defines a plurality of fuel inlet slots 128. Each fuel inlet slot 128 is in fluid communication with the fuel plenum 110 and is fluidly coupled to the fluid conduit 50. FIG. 4 provides a downstream view of the fuel nozzle assembly 100 according to at least one embodiment of the present disclosure. As shown in FIG. 4, each fuel inlet slot 128 extends radially outwardly with respect to an axial centerline 130 of the fuel plenum body 102 and/or of the fluid conduit 50 (FIG. 3). Each fuel inlet slot 128 extends radially along the outer surface 118 of the forward plate 104 from the axial centerline 130 towards the outer band 108. In at least one embodiment, the plurality of fuel inlet slots 128 is formed in a crisscross or star pattern across the outer surface 118 of the forward plate 104.

The shape or number of the fuel inlet slots 128 is not limited to any particular shape or number of fuel inlet slots 128 unless specifically recited in the claims. For example, one or more of the fuel inlet slots 128 may converge from the axial centerline 130 towards the outer band 108. In other embodiments, at least one of the fuel inlet slots 128 may be rectangular shaped. In particular embodiments, there may be one, two, three, four, five or more fuel inlets slots 128 defined along the outer surface 118 of the forward plate 104.

Figure 5:
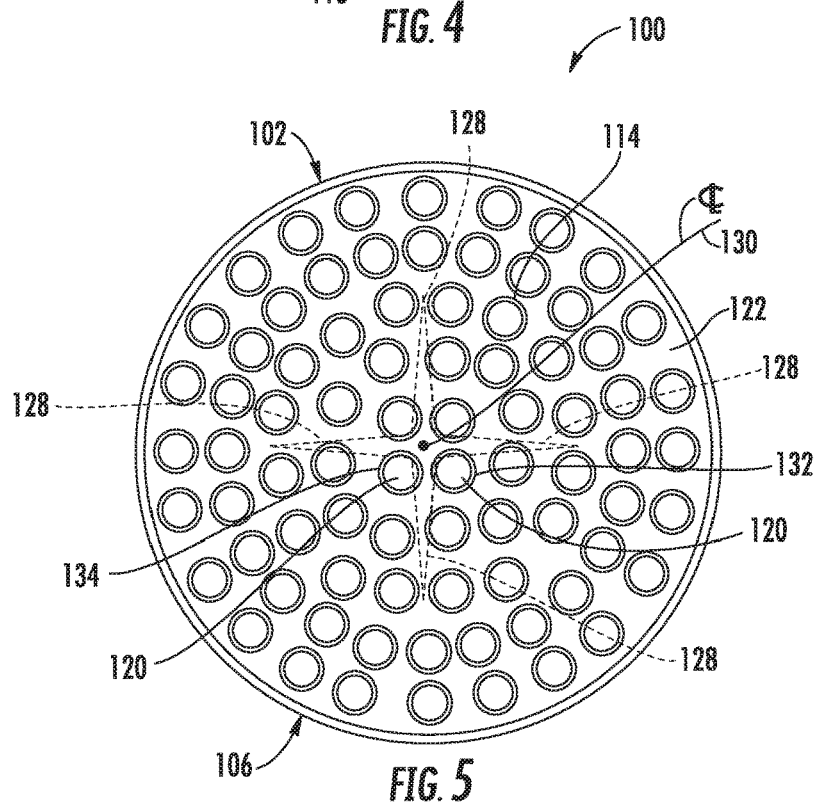
FIG. 5 is an upstream view of an aft plate of the fuel nozzle assembly as shown in FIG. 3, according to at least one embodiment of the present disclosure.

As shown in FIG. 4, at least one fuel inlet slot 128 of the plurality of fuel inlet slots 128 extends between respective inlets 116 of at least two adjacent tubes 132, 134 of the plurality of tubes 114. FIG. 5 provides an upstream view of the fuel nozzle assembly 100 with the fuel inlet slots 128 shown in hidden lines according to at least one embodiment of the present disclosure. As shown in FIGS. 4 and 5 collectively, the respective outlets 120 of the at least two adjacent tubes 114 are radially offset from the respective inlets 116 (FIG. 4) of the at least two adjacent tubes 132, 134 of the plurality of tubes 114 with respect to the axial centerline 130 of the fuel plenum body 102.

Figure 6:
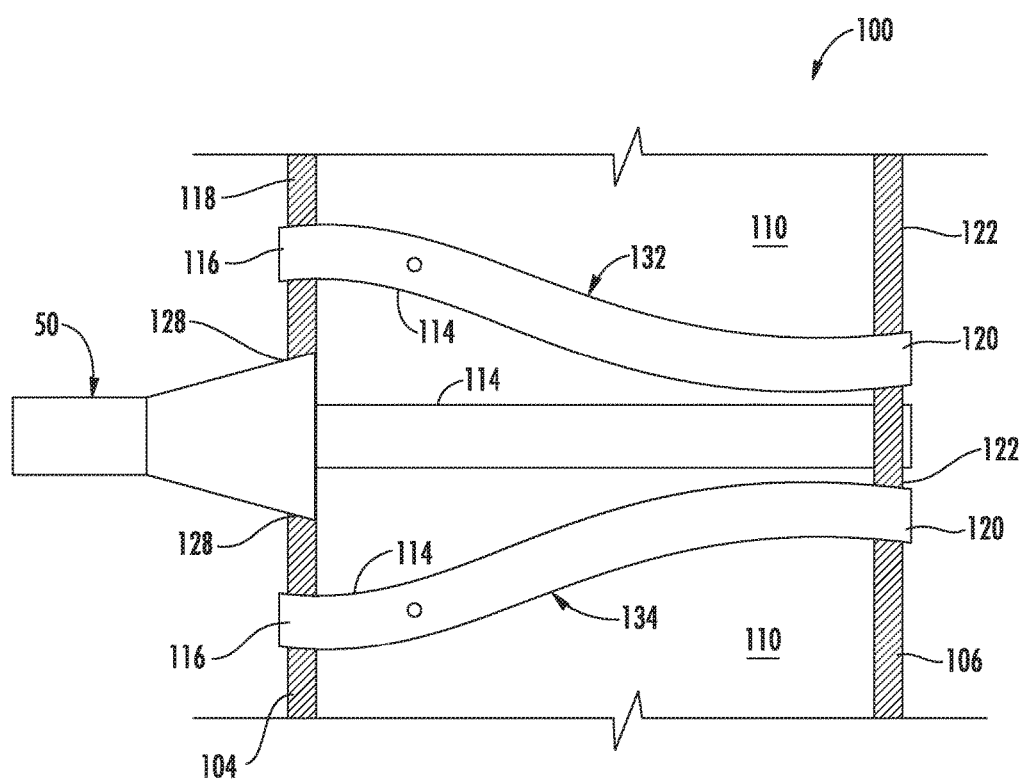
FIG. 6 is a cross sectioned side view of a portion of the exemplary fuel nozzle assembly as shown in FIG. 3, according to at least one embodiment of the present disclosure.

FIG. 6 provides a side view of a portion of the fuel nozzle assembly 100 including the two adjacent tubes 132, 134 of the plurality of tubes 114 according to at least one embodiment of the present disclosure. As shown in FIG. 6, a portion of each adjacent tube 132, 134 may be bent or curved between the respective inlet 116 and the respective outlet 120 so as to reduce or minimize any void or bluff area along the hot side surface 122 of the aft plate 106 between the respective outlets 120 of the respective adjacent tubes 132, 134. In particular embodiments, the bent portion of the tubes 132, 134 may be disposed within the fuel plenum 110.

Figure 7:
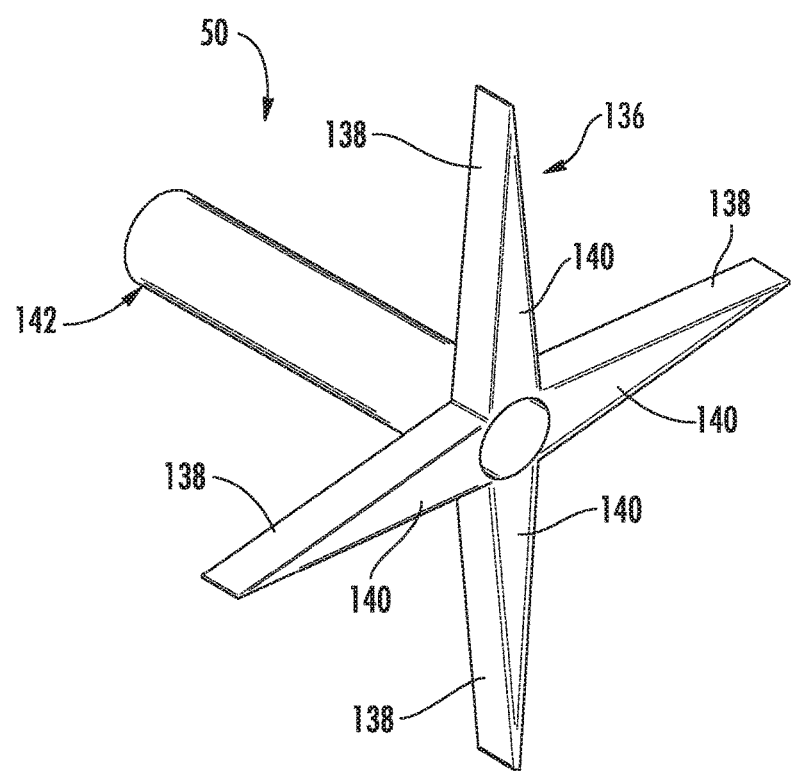
FIG. 7 is an isometric view of an exemplary fluid conduit according to at least one embodiment of the present disclosure.

FIG. 7 provides an isometric view of an exemplary fluid conduit 50 according to at least one embodiment of the present disclosure. In particular embodiments, as shown in FIG. 7, the fluid conduit 50 includes a downstream end portion 136 defining a plurality of radially extending fuel distribution arms 138. Each fuel distribution arm 138 may define an individual fuel distribution channel 140 that is fluidly coupled to a respective fuel inlet slot 128 (FIG. 4) of the plurality of fuel inlet slots 128. For example, the fuel distribution arms 138 may be welded, brazed or otherwise mechanically attached to the forward plate 104. In particular embodiments, the fuel distribution arms 138 may be formed as part of the forward plate 104. In particular embodiments, an upstream end portion 142 of the conduit includes a circular upstream end portion.

The bundled tube type fuel nozzle assembly 100 as described and as illustrated herein provides various technical benefits over existing bundled tube type fuel nozzle assemblies. For example, the non-round fuel inlet slots 128 along with the bent tubes 114 allow for a greater number of tubes 114 when compared with conventional bundled tube type fuel nozzle assemblies, thereby resulting in a lower pressure drop between the head end 38 of the combustor 16 and the combustion zone 42. In addition, the non-round fuel inlet slots 128 along with the bent tubes 114 result in a reduced or smaller bluff area along the hot side surface 122, thereby reducing the amount of cooling flow required to cool the aft plate 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel nozzle assembly, comprising:
    a fuel plenum body including a forward plate, an aft plate, an outer band that extends between the forward plate and the aft plate and a fuel plenum defined within the fuel plenum body; and
    a plurality of tubes extending through the fuel plenum, wherein each tube of the plurality of tubes includes an inlet defined along an outer surface of the forward plate and an outlet defined downstream from the inlet;
    wherein the forward plate defines a first fuel inlet slot and a second fuel inlet slot in fluid communication with the fuel plenum, wherein the first fuel inlet slot extends radially outwardly with respect to an axial centerline of the fuel plenum body along the outer surface of the forward plate and wherein the first fuel inlet slot and the second fuel inlet slot crisscross across the forward plate.

2. The fuel nozzle assembly as in claim 1, wherein the first fuel inlet slot extends between respective inlets of at least two adjacent tubes of the plurality of tubes.

3. The fuel nozzle assembly as in claim 2, wherein respective outlets of the at least two adjacent tubes are radially offset from the respective inlets of the at least two adjacent tubes with respect to the axial centerline of each respective tube of the two adjacent tubes.

4. The fuel nozzle assembly as in claim 1, further comprising a fluid conduit having a downstream end portion defining a radially extending fuel distribution channel, wherein the fuel distribution channel is fluidly coupled to the first fuel inlet slot.

5. The fuel nozzle assembly as in claim 4, wherein the fluid conduit includes a circular upstream end portion.

6. The fuel nozzle assembly as in claim 1, wherein at least one tube of the plurality of tubes includes a fuel port, wherein the fuel port is in fluid communication with the fuel plenum.

7. A combustor, comprising:
an outer casing;
a fuel nozzle assembly disposed within the outer casing and coupled to a fuel supply via one or more fluid conduits, wherein the fuel nozzle assembly comprises:
a fuel plenum body including a forward plate, an aft plate, an outer band that extends between the forward plate and the aft plate and a fuel plenum defined within the fuel plenum body; and
a plurality of tubes, each tube extending through the fuel plenum, wherein each tube includes an inlet defined along an outer surface of the forward plate and an outlet defined downstream from the inlet;
wherein the forward plate defines a plurality of fuel inlet slots in fluid communication with the fuel plenum, wherein each fuel inlet slot extends radially outwardly with respect to an axial centerline of the fuel plenum body along the outer surface of the forward plate, and wherein the plurality of fuel inlet slots is formed in a crisscross pattern across the forward plate.

8. The combustor as in claim 7, wherein at least one slot of the plurality of slots extends between respective inlets of at least two adjacent tubes of the plurality of tubes.

9. The combustor as in claim 8, wherein respective outlets of the at least two adjacent tubes are radially offset from the respective inlets of the at least two adjacent tubes with respect to the axial centerline of the fuel plenum body.

10. The combustor as in claim 7, wherein the fluid conduit includes a downstream end portion defining a plurality of radially extending fuel distribution channels, wherein each fuel distribution channel is fluidly coupled to a respective fuel inlet slot of the plurality of fuel inlet slots.

11. The combustor as in claim 10, wherein the fluid conduit includes a circular upstream end portion.

12. The combustor as in claim 7, wherein at least one tube of the plurality of tubes includes a fuel port, wherein the fuel port is in fluid communication with the fuel plenum.

13. A gas turbine comprising;
a compressor;
a combustor disposed downstream from the compressor, the combustor having an outer casing; and
a turbine disposed downstream from the combustor, wherein the combustor further comprises;
a fuel nozzle assembly disposed within the outer casing and coupled to an end cover via one or more fluid conduits, wherein the fuel nozzle assembly comprises:
a fuel plenum body including a forward plate, an aft plate, an outer band that extends between the forward plate and the aft plate and a fuel plenum defined within the fuel plenum body; and
a plurality of tubes, each tube extending through the fuel plenum, wherein each tube includes an inlet defined along an outer surface of the forward plate and an outlet defined downstream from the inlet;
wherein the forward plate defines a plurality of fuel inlet slots in fluid communication with the fuel plenum, wherein each fuel inlet slot extends radially outwardly with respect to an axial centerline of the fuel plenum body along the outer surface of the forward plate, and wherein the plurality of fuel inlet slots is formed in a crisscross pattern across the forward plate.

14. The gas turbine as in claim 13, wherein at least one slot of the plurality of slots extends between respective inlets of at least two adjacent tubes of the plurality of tubes.

15. The gas turbine as in claim 14, wherein respective outlets of the at least two adjacent tubes are radially offset from the respective inlets of the at least two adjacent tubes with respect to the axial centerline of the fuel plenum body.

16. The gas turbine as in claim 13, wherein the fluid conduit includes a downstream end portion defining a plurality of radially extending fuel distribution channels, wherein each fuel distribution channel is fluidly coupled to a respective fuel inlet slot of the plurality of fuel inlet slots, and wherein the fluid conduit includes a circular upstream end portion.

17. The gas turbine as in claim 13, wherein at least one tube of the plurality of tubes includes a fuel port, wherein the fuel port is in fluid communication with the fuel plenum.

* * * * *